(12) United States Patent
Foxon

(10) Patent No.: US 7,279,212 B2
(45) Date of Patent: *Oct. 9, 2007

(54) PLAYING SURFACE STRUCTURE AND METHOD OF CONSTRUCTION OF A PLAYING SURFACE

(75) Inventor: Stephen Alan Foxon, Broughton Astley (GB)

(73) Assignee: Nottinghamshire Sports & Safety Systems Limited, Oadby (GB)

( * ) Notice: Subject to any disclaimer, the term of this patent is extended or adjusted under 35 U.S.C. 154(b) by 195 days.

This patent is subject to a terminal disclaimer.

(21) Appl. No.: 10/816,263

(22) Filed: Mar. 31, 2004

(65) Prior Publication Data

US 2004/0209038 A1    Oct. 21, 2004

(30) Foreign Application Priority Data

Apr. 3, 2003    (GB)    .................... 0307672.6

(51) Int. Cl.
- B32B 33/00    (2006.01)
- B32B 3/02    (2006.01)
- B32B 5/12    (2006.01)

(52) U.S. Cl. ............... 428/95; 428/86; 428/87; 428/17; 472/92; 472/94

(58) Field of Classification Search ............... 428/95, 428/86, 87, 17; 472/92, 94
See application file for complete search history.

(56) References Cited

U.S. PATENT DOCUMENTS

| | | | | | |
|---|---|---|---|---|---|
| 3,607,588 | A | * | 9/1971 | Soehngen | 428/86 |
| 3,616,126 | A | * | 10/1971 | Tungseth | 428/86 |
| 3,900,656 | A | | 8/1975 | Schmidt | |
| 4,044,179 | A | * | 8/1977 | Haas, Jr. | 428/17 |
| 4,301,207 | A | * | 11/1981 | Schomerus | 442/43 |
| 4,336,286 | A | * | 6/1982 | Tomarin | 428/17 |
| 4,364,331 | A | * | 12/1982 | Foenard | 119/526 |
| 4,497,853 | A | | 2/1985 | Tomarin | |
| 4,819,933 | A | | 4/1989 | Armond | |
| 5,183,438 | A | * | 2/1993 | Blom | 472/92 |
| 5,352,158 | A | * | 10/1994 | Brodeur, Jr. | 472/92 |
| 5,384,001 | A | | 1/1995 | Hoopengardner | |
| 5,453,150 | A | | 9/1995 | Hoopengardner | |
| 5,658,430 | A | * | 8/1997 | Drake et al. | 156/71 |
| 5,796,645 | A | * | 8/1998 | Peh et al. | 708/603 |
| 5,849,387 | A | * | 12/1998 | Drake et al. | 428/86 |
| 5,951,798 | A | * | 9/1999 | Schmidt et al. | 156/148 |
| 5,955,174 | A | * | 9/1999 | Wadsworth et al. | 428/181 |
| 6,029,397 | A | * | 2/2000 | Motz et al. | 47/58.1 R |

(Continued)

FOREIGN PATENT DOCUMENTS

EP    0065622    10/1982

(Continued)

*Primary Examiner*—Cheryl Juska
(74) *Attorney, Agent, or Firm*—Baker Botts L.L.P.

(57) ABSTRACT

A playing surface structure (100) comprises, a surface carpet layer (102), a resin impregnated textile layer (104), a random pile layer (108) comprising a compact resin loaded fibre stratum (109) and a layer of stratified fibrous material (110). The surface carpet layer (102) overlays the textile layer (104), the textile layer (104) overlays the random pile layer (108), and the layer of stratified fibrous material (110) is overlain by the random pile layer (108). A method of construction of a playing surface is also disclosed.

13 Claims, 1 Drawing Sheet

U.S. PATENT DOCUMENTS

| | | | | |
|---|---|---|---|---|
| 6,035,577 A | * | 3/2000 | Motz et al. | 47/58.1 R |
| 6,066,388 A | * | 5/2000 | Van Kerrebrouck | 428/218 |
| 6,094,860 A | * | 8/2000 | Motz et al. | 47/58.1 R |
| 6,295,756 B1 | * | 10/2001 | Bergevin | 47/1.01 R |
| 6,472,041 B1 | * | 10/2002 | Burke | 428/86 |
| 6,846,545 B2 | * | 1/2005 | Thomas | 428/85 |
| 6,858,272 B2 | * | 2/2005 | Squires | 428/17 |
| 2002/0132099 A1 | * | 9/2002 | Squires | 428/220 |
| 2003/0039511 A1 | * | 2/2003 | Prevost | 405/36 |
| 2003/0168146 A1 | * | 9/2003 | Wenstrup et al. | 156/62.2 |
| 2004/0180177 A1 | * | 9/2004 | Ray et al. | 428/86 |
| 2005/0238433 A1 | * | 10/2005 | Daluise | 405/46 |

FOREIGN PATENT DOCUMENTS

| | | |
|---|---|---|
| EP | 0174755 | 3/1986 |
| EP | 0 495 332 A1 | 7/1992 |
| WO | WO87/07520 | 12/1987 |
| WO | WO 87/07520 | 12/1987 |
| WO | 92/05317 | 4/1992 |
| WO | 93/07790 | 4/1993 |

* cited by examiner

PLAYING SURFACE STRUCTURE AND METHOD OF CONSTRUCTION OF A PLAYING SURFACE

CROSS REFERENCE TO RELATED APPLICATIONS

The present application claims the benefit of Great Britain Application No. GB 0307672.6 filed on Apr. 3, 2003.

TECHNICAL FIELD OF THE INVENTION

This invention relates to a playing surface structure and a method of construction of a playing surface. More particularly, but not exclusively, the invention relates to playing surface structures for playgrounds.

BACKGROUND OF THE INVENTION

Impact absorbing surfaces (IAS) for playgrounds are now used in preference to concrete as they can reduce the chance of serious injury or death of a child striking them.

A number of structures for these IAS are known, for example, layers of aggregate, typically Lytag™, and/or sand enclosed in a geotextile envelope and topped by a synthetic grass carpet layer. The layers of sand and aggregate are segregated by walls of the envelope in order to prevent depletion of regions of the structure due, for example, to repeated compression in regions subjected to much wear and/or impact such as under a swing, or due to the action of ground water or rain moving the aggregate and/or sand, or to protect the specialist aggregates from migration of 'foreign' materials from the sub-structure causing 'contamination' of the performance layers. Such compression, movement or contamination of the aggregate and/or sand degrades the performance of the IAS.

These structures have inherent practical and/or logistical problems associated with them such as the need to transport mineral aggregate infill to an installation site. Additionally, spillage of aggregate infill at an installation site is costly as spilled aggregate infill must be removed from the playing surfaces. Further to which in order to achieve a consistent surface layer it is necessary to have level aggregate infill and geotextile envelope structures and this requires labour intensive hand finishing.

Another IAS structure utilises a rubber granulate material which is screeded into and stabilised by a random pile layer which is usually overlain by a resin impregnated textile material. A synthetic grass carpet layer tops the textile material.

Attempts have been made to remove the need for aggregate infill by fabricating a playing surface underlay from multiple layers of a random pile material, for example a material known as vertical horizontal angular fibre (VHAF™) but this has limited applications.

Also, the use of bound rubber tiles or wetpour rubber is known. However, such systems can suffer from breakdown of resins used in the binding of the rubber over time and their performance can degrade accordingly.

Each playing surface must fulfill a standard, the head injury criteria (HIC), which is the integral of the force, measured in G's, applied by a test piece, dropped from a known fall height (measured in metres) onto the playing surface, with respect to time (seconds), i.e. $\int F.dt$. The value of the HIC must not exceed 1000 at a given fall height if a playing surface is to be considered appropriate for use at that fall height. A measure of the critical fall height (CFH) is the height at which the HIC reaches a value of 1000. The height at which the maximum force exerted exceeds 200 G can also be taken as a measure of the CFH.

A playing surface constructed from multiple layers of VHAF™ matting cannot achieve high enough CFH values without a substantial number layers being used, more than is economically viable.

SUMMARY OF THE INVENTION

We have found that multiple layers of a vertically lapped, stratified fibrous material can achieve CPR values of 3 meters or even more, in an economically viable way, but if this is done the structure presents a surface which is unnaturally soft for a user to walk on and has an attendant risk of giving rise to twisting injuries to a user's ankle, or injuring the user in some other manner.

There is thus an apparent conflict between the requirements for avoiding impact injuries to users' heads and the requirements for achieving a firm footing.

It is an object of this invention to provide a multi-layered playing surface structure which can be arranged to provide a more satisfactory compromise between achieving a relatively high critical fall height and a relatively low degree of 'softness', in a more efficient manner.

According to a first aspect of the present invention there is provided a playing surface structure comprising:
a surface carpet layer;
a resin impregnated textile layer;
at least one random pile layer comprising a compact resin loaded fibre stratum;
at least one layer of stratified fibrous material;
wherein the surface carpet layer overlays the textile layer, the textile layer overlays such random pile layer, and the layer of stratified fibrous material is overlain by the or at least one random pile layer.

We have found that the use of a playing surface structure in accordance with the invention permits the achievement of a surprisingly effective combination of properties in that a high critical fall height can be achieved while at the same time affording a firm footing.

Despite extensive tests it is not quite clear precisely why this should be so, but at present we attribute the effectiveness of the invention to the following:

the layer of random pile material affords firmness and stability to the structure due at least in part to the compact resin loaded stratum, without contributing significantly to hardness, while the underlaying layer of stratified fibrous material gives a resilience to the structure thus contributing to a high critical fall height. Furthermore, the random pile layer tends to protect the layer of stratified fibrous material against degradation and/or compression in areas subjected to a particularly high wear and/or impact. The resin impregnated textile layer further contributes to the stability of the structure, And the surface carpet layer may be arranged to provide a wear-resistant finish to the structure.

Such a structure has a further advantage over current playing surface structures in that there is no need to transport mineral aggregate infill. The structure reduces the amount of hand finishing necessary as there is not a mineral aggregate infill layer included in the structure.

Desirably, the layer of stratified fibrous material is a lapped fibre layer. More desirably the lapped fibre layer is lapped vertically. It will be appreciated that suitable variation in the orientation of the lapping of the fibres within the stratified fibrous material will alter the properties of the stratified fibrous material and consequently the properties of the playing surface structure.

Preferably the structure comprises a plurality of alternating random pile layers and layers of stratified fibrous material. Increasing the number of layers increases the achievable CFH of the structure. Desirably the layer of stratified fibrous material overlays a further random pile layer.

Preferably, the random pile layer is a vertical, horizontal and angular fibre (VHAF™) layer. This composition imparts resilience into the random pile layer. The or at least one random pile layer is laden with particulate material. The particulate material is suitably rubber particles and/or sand. More preferably still the particles are brushed into the random pile layer. Desirably the random pile layer is at least partially covered with a layer of particles, typically rubber particles. The use of particulate infill and overfill of the random pile layer adds stiffness and/or extra resilience to the structure.

Preferably at least a portion of the particulate matter in the layer covering the random pile layer is rubber and is bonded to the resin impregnated textile layer. This adds further resilience to the structure and reduces, possibly removes, the need to apply loose rubber particles to the random pile layer. In some embodiments of the present invention there will be a layer of rubber particles beneath the resin impregnated textile layer that may infill and/or overfill the random pile layer.

Advantageously the carpet layer includes a pile which is laden with particulate material. More advantageously the particles are rubber particles and/or sand. Addition of rubber or sand is a convenient way of allowing modification of the resilience and/or firmness of the structure.

Desirably the resin impregnated textile layer is arranged to act as a stiffening layer.

According to a second aspect of the present invention there is provided a playing surface structure comprising, in order:

a surface carpet layer having a sand laden pile;

a resin impregnated textile layer optionally having rubber particles bonded thereto;

a first random pile textile mat which is laden with rubber particles, and comprises a compacte resin bonded fibrous stratum;

a vertically lapped textile mat; and a second random pile textile mat which is laden with rubber particles, and has a compact resin bonded fibrous stratum.

Preferably a second vertically lapped textile mat lies beneath the second random pile textile mat.

According to a third aspect of the present invention there is provided a method of construction of a playing surface comprising the steps of:

i) laying a layer of stratified fibrous material upon a substrate;

ii) laying a random pile layer, comprising a compact resin loaded stratum, over the layer of stratified fibrous material;

iii) laying a resin impregnated textile layer over the random pile layer; and iv) laying a surface carpet layer over the resin impregnated textile layer.

The method may include laying a plurality of pieces of random pile layer and binding adjacent pieces of random pile layer using adhesive tape.

The method may include loading pile of the random pile layer with particulate material. The method may include overlaying the random pile layer with particulate. The particulate may be bonded to the resin loaded textile layer. The method may include providing the particulate in the form of rubber particles and/or sand.

The method may include laying a plurality of pieces of resin impregnated textile layer and bonding adjacent pieces of resin impregnated textile layer by means of adhesive tape. The method may include laying a plurality of pieces of surface carpet layer and binding adjacent pieces of surface carpet layer using adhesive tape.

The method may include providing the adhesive tape in the form of hot melt bonding adhesive tape, or applying hot or cold adhesive to a separate textile carrier.

The, or at least one, random pile layer may be manufactured by needle punching a resin impregnated randomly oriented fibrous mat to form a compact layer which is then subjected to a second needle punching operation by which a randomly oriented pile is extracted from the compact layer to leave a mat having a randomly oriented pile supported by a compact resin loaded layer.

BRIEF DESCRIPTION OF THE DRAWINGS

The invention will now be described, by way of example only, with reference to the accompanying drawings, in which.

DETAILED DESCRIPTION OF THE DRAWINGS

Figure 1:
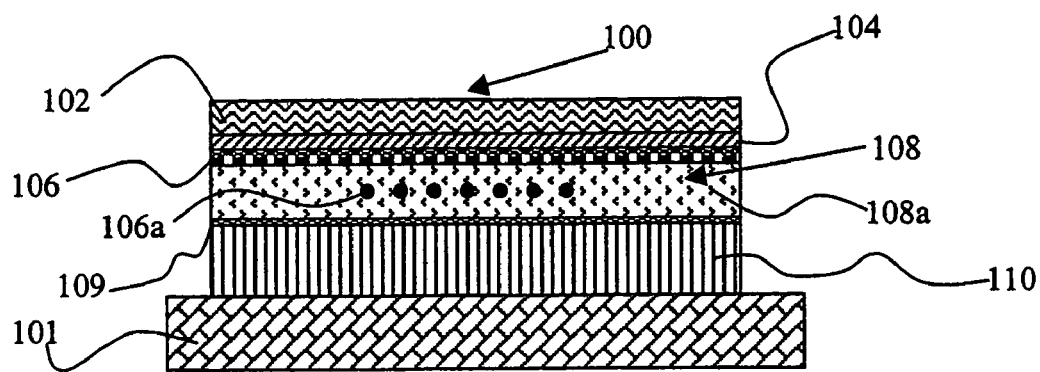
FIGS. 1 to 3 are schematic cross-sections of embodiments of playing surface structures according to the present invention.

Referring now to FIG. 1, a playing surface structure 100 sits upon a substrate 101, typically stone, concrete, macadam, sand or clay. The use of stone or sand will promote drainage if the surface is located out of doors. The structure comprises a synthetic sward top carpet 102, see Table 1 for typical characteristics of such a carpet, into which sand is brushed, see Table 2 for typical characteristics of the sand. A resin impregnated textile 104, typically a geotextile, see Table 3 for typical characteristics of the textile, lies underneath the carpet 102. Adjacent a lower surface of the textile 104 is a layer of rubber particulate 106, see Table 5 for typical characteristics of the rubber particulate, typically 2 $Kgm^{-2}$. The rubber particulate 106 may be adherent to the textile 104 or it may be loosely screeded onto a random pile layer 108. The random pile layer comprises a relatively loose random pile 108a and a relatively compact resin loaded backing layer 109, see Table 4 for typical characteristics of the random pile layer 108. A suitable material is described in EP 0174755.

Typically, random pile layer 108 is manufactured by needle punching, a resin impregnated randomly oriented fibrous mat to form a compact layer. This compact layer is then subjected to a second needle punching operation by which a randomly oriented pile 108a is extracted from the compact layer to leave a mat having the randomly oriented pile 108a supported by the compact resin loaded backing layer 109. Typically the backing layer 109 lies at a surface of the random pile layer 108.

Further rubber particulate 106a is typically brushed into the random pile layer 108, usually about 2 $Kgm^{-2}$. A layer of stratified fibrous material 110, see Table 6 for typical characteristics of the stratified fibrous material 110, lies beneath the random pile layer 108 and has its fibres oriented vertically. The stratified fibrous material 110 is typically made by vertical lapping of synthetic yarn.

Figure 2:
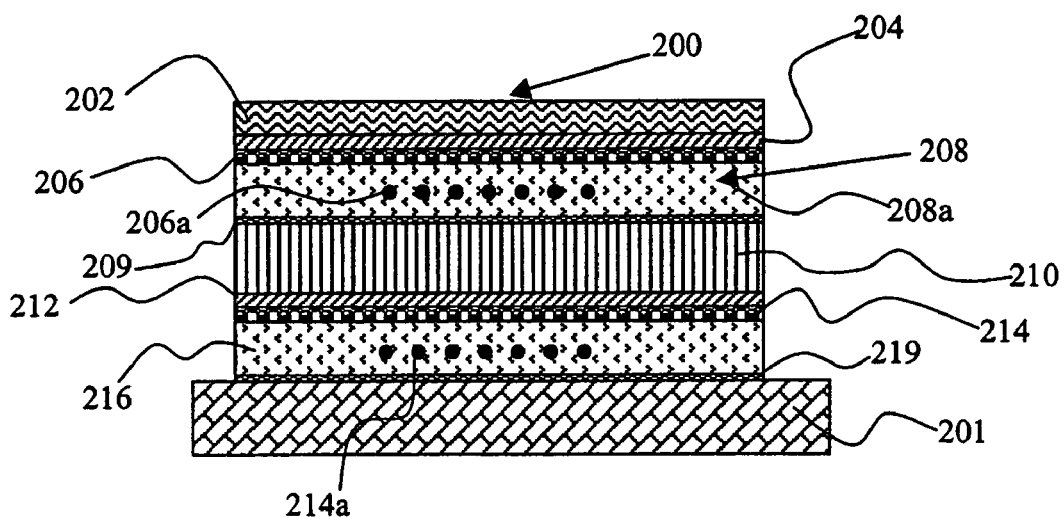

Referring now to FIG. 2, a playing surface structure 200 is substantially similar to that of FIG. 1 and corresponding features are accorded similar reference numerals in the two hundred series.

A second resin impregnated textile 212 underlies the stratified fibrous material 210 and is underlain by a second rubber particulate layer 214. The rubber particulate layer can either be adherent to the resin impregnated textile 212 or loose. A random pile layer 216 having a resin filled compact stratum 219 underlies the rubber particulate layer 214. The second random pile layer 216 has rubber particulate 214a screeded into it, typically 2 Kgm$^{-2}$. It is envisaged that the second resin impregnated textile 212 can be omitted in certain embodiments of the present invention.

Figure 3:
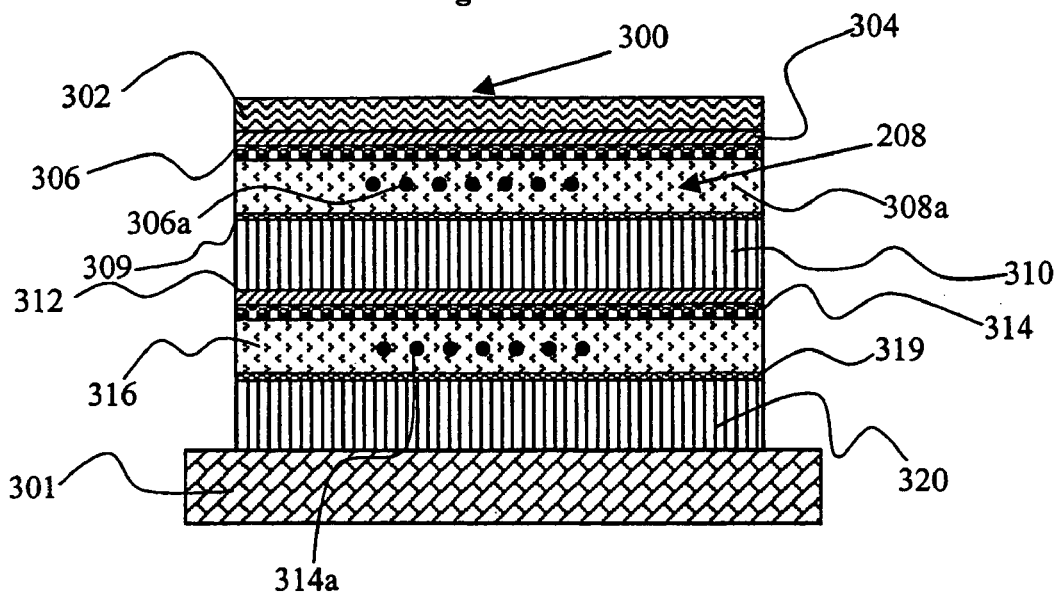

Referring now to FIG. 3, a playing surface structure 300 is substantially similar to that of FIG. 2 and corresponding features are accorded similar reference numerals in the three hundred series.

A second layer of stratified fibrous material 320 underlies the second random pile layer 316.

If a large playing surface is laid a number of pieces of the structure will be laid adjacent each other to make up the total playing area. These pieces can be joined together to prevent relative movement between them. This is typically achieved by hot melt tape bonding the random pile layers of adjacent pieces of the structure, preferably prior to the application of the rubber particles to avoid the risk of melting them. Alternatively, or additionally, adhesive tape can be applied to join the textile layers of adjacent pieces of the structure and/or hot melt tape bonding the carpet layers of adjacent pieces of the structure. One of many systems suitable for such hot melt tape bonding is disclosed in U.S. Pat. No. 5,453,150.

Thus, for example in the construction of the FIG. 3 embodiment, the bottom layer 320 of stratified fibrous material may be laid on a suitable substrate 301 and seamed together using adhesive tape on its upper surface. The lower random pile layer 316, 319 is laid and seamed from below using hot-melt tape. The pile layer 316 is charged with rubber particles 314a and overcoated with a further layer 314 of rubber particles which may be bonded to an optional geotextile layer 312. A second layer 310 of stratified fibrous material is laid and seamed together using adhesive tape (on its upper surface). An upper layer 308, 309 of random pile mat is laid over the layer 310 of stratified fibrous material and is seamed from below using adhesive tape. Rubber particles 306a, are brushed into the pile 308, and a geotextile layer 304 bearing an adherent layer of rubber particles 306 on its underside is laid over the upper random pile mat 308, 309, and seamed on it's upper surface using adhesive tape. A surface carpet layer 302 is applied and seamed together, if necessary, on its underside with a hot-melt tape or suitable jointing process for the surface used. The rubber particles 306 are protected from excessive heating and/or disturbance by the geotextile layer 304. Finally, sand may be screeded onto and brushed into the pile of the surface carpet.

With reference to the following Tables all materials are manufactured in line with standard manufacturer's tolerances of plus or minus 10% on weights and manufacturing measurements. All roll sizes in width and length are subject to plus or minus.

TABLE 1

(Surface Carpet)

| | |
|---|---|
| Fibre | 110/18 Denier UVF Polypropylene |
| Blend | 75% at 110 denier, 25% at 18 denier |
| Fibre Weight | 1150 gms/sqm |
| Total Weight | 1380 gms/sqm |
| Total Thickness | 16–18 mm. (Pile height above backing 12–14 mm) |
| Manufacture | Needlepunched with resin impregnation to backing. |
| Bonding | Back-coated with SBR compound plus cross linking agent. |
| Coating | At 20% pick up gives 230 gsm |
| Backing Thickness | 4 mm |
| Flammability | Hot Nut BS4790 - Low Char Radius NBS Radiant Panel - Category 1 usage |
| Wearability | Pile loss after 1,000 passes 4.4 mm |
| (LISSON TRETARD) | 3,000 passes 4.7 mm |
| Porosity | Approximately 5200 mm/br |

TABLE 2

(Sand)

| | | Percentage by weight retained | | |
|---|---|---|---|---|
| Aperture | B.S.S. | Typical Grading | | Cumulative |
| mm | MESH No. | Fractional | Cumulative | Range |
| 1.00 | 16 | TRACE | TRACE | NIL-0.5 |
| 0.71 | 22 | 2.5 | 2.5 | NIL-10 |
| 0.60 | 25 | 19.5 | 22.0 | 5–45 |
| 0.50 | 30 | 27.5 | 49.5 | 30–70 |
| 0.355 | 44 | 35.5 | 85.0 | 60–95 |
| 0.25 | 60 | 11.5 | 96.5 | 90–100 |
| 0.18 | 85 | 3.0 | 99.5 | 95–100 |

TABLE 3

(Textile)

| | |
|---|---|
| Fibre | Polyester |
| Fibre denier | 6 to 120 |
| Colour | White |
| Total weight | 270 gms/m · sqr. (not less than) |
| Thickness | 1–2 mm |
| Manufacture | Needlepunched with resin binding |
| Porosity | 50 l/s/m |
| Stiffness | Test method NCC/SFAL not less than, nil. No more than 25 mm. |
| Tensile Properties | BS6906 Part 11987 Not less than 6.0 kn/m |
| Elongation Peak load | No more than 70% |
| Ability to resist silting up | Test method NS/PLK04 Surface layer, no greater than 3 mm Infiltration rate, no less than 40 mm per hour after contamination |

TABLE 4

(VHAF ™)

| | |
|---|---|
| Fibre | 110/18 Denier Polypropylene |
| Blend | 75% at 110 denier, 25% at 18 denier |
| Fibre Weight | 1150 gms/sqm |
| Total Weight | 1380 gms/sqm |

TABLE 4-continued (VHAF ™)

| | |
|---|---|
| Total Thickness | 18 mm. (Pile height above backing 12–14 mm) |
| Manufacture | Needlepunched with resin impregnation to backing. |
| Bonding | Back-coated with SBR compound plus cross linking agent. |
| Coating | At 20% pick up gives 230 gsm |
| Backing Thickness | 4 mm |
| Flammability | Hot Nut BS4790 - Low Char Radius NBS Radiant Panel - Category 1 usage |
| Wearability | Pile loss after 1,000 passes 4.4 mm |
| (LISSON TRETARD) | 3,000 passes 4.7 mm |
| Porosity | Approximately 5200 mm/hr |

TABLE 5

(Rubber Particulate)

| | |
|---|---|
| Type/Name of Material: | Tyre rubber granulate |
| Main Range of Particles: | 0.5 mm to 1.50 mm |
| Breakdown of Particle Range: | |
| 0.50 mm | 5% to 35% |
| 1.00 mm | 30% to 60% |
| 1.40 mm | 5% to 40% |
| Material Analysis: | |
| Total polymer content (natural & synthetic rubbers) | 56% minimum |
| Acetone Extract | 9% to 20% |
| Carbon black | 25% to 35% |
| Ash at 550° C. | 8% max |
| Sulphur | 1% to 3% |
| Hardness | 60–79 IRHD |

TABLE 6

(Stratified Fibrous Material)

| | |
|---|---|
| Manufacture | The film layer will be of vertically lapped textile construction on a Struto manufacturing machine laminated to a backing scrim |
| Fibre | 70% Polypropylene/30% Bi-Com Polyester |
| Denier | 5 to 110 |
| Fibre Weight | Not less than 1650 gms/sqm |
| Backing Scrim Weight | 100 gms/sqm |
| Total Thickness | 20 mm |
| Backing | 100% polypropylene woven scrim |

It will be appreciated that by "rubber" is meant one or more of natural rubber, or something containing natural rubber; synthetic rubber, or something containing synthetic rubber; a resistant force-absorbing material that can take the place of rubber in use, such as a resilient plastics, or polymeric material.

Limitation to natural rubber is not intended for many embodiments, although some embodiments may use natural rubber.

Similarly, references to "sand" may in many embodiments refer to "proper" sand since this is cheap and durable and well-tried by us in experiments, but should not in other embodiments be viewed as restrictive. Another particulate material replacement for sand many be envisaged, for example another small-sized incompressible, or substantially incompressible particulate material, possibly having a uniform particle size or possibly having a range of particle sizes: something that can take the place of sand in use and perform comparably.

What is claimed is:

1. A playing surface structure comprising:
   a surface carpet layer;
   a resin impregnated textile layer;
   at least one random pile layer comprising a compact resin loaded fibre stratum;
   at least one layer of stratified fibrous material;
   wherein the surface carpet layer overlays the textile layer, the textile layer overlays such random pile layer, and the layer of stratified fibrous material is overlain by the at least one random pile layer;
   wherein the layer of stratified fibrous material is a lapped fibre layer and wherein the lapped fibre layer is lapped vertically.

2. A structure according to claim 1 wherein the random pile layer is a layer having fibres that extend generally in vertical and in horizontal directions, and in angular directions inclined both vertical and horizontal.

3. A structure according to claim 1 wherein pile of the or at least one random pile layer is laden with particulate material.

4. A structure according to claim 1 wherein the random pile layer is at least partially covered with a layer of particulate material.

5. A structure according to claim 4, wherein at least a portion of the particulate material in the layer covering the random pile layer is rubber and is bonded to the resin impregnated textile layer.

6. A structure according to claim 1 wherein the carpet layer includes a pile which is laden with particulate material.

7. A structure according to claim 1 wherein the pile of the random pile layer is laden with particulate material which comprises one of sand, rubber particles, or sand and rubber particles.

8. A structure according to claim 3 wherein the particulate material is brushed into the random pile layer.

9. A playing surface structure comprising:
   a surface carpet layer;
   a resin impregnated textile layer;
   at least one random pile layer comprising a compact resin loaded fibre stratum;
   at least one layer of stratified fibrous material;
   wherein the surface carpet layer overlays the textile layer, the textile layer overlays such random pile layer, and the layer of stratified fibrous material is overlain by the at least one random pile layer;
   a plurality of alternating random pile layers and layers of stratified fibrous material.

10. A playing surface structure comprising:
    a surface carpet layer;
    a resin impregnated textile layer;
    at least one random pile layer comprising a compact resin loaded fibre stratum;
    at least one layer of stratified fibrous material;
    wherein the surface carpet layer overlays the textile layer, the textile layer overlays such random pile layer, and the layer of stratified fibrous material is overlain by the at least one random pile layer;
    wherein the layer of stratified fibrous material overlays a further random pile layer.

11. A playing surface structure according to claim 1 comprising, in order:

a surface carpet layer having a sand laden pile;
a resin impregnated textile layer optionally having rubber particles bonded thereto;
a first random pile textile mat which is laden with rubber particles, and which comprises a compact resin bonded fibrous stratum;
a vertically lapped textile mat; and
a second random pile textile mat which is laden with rubber particles, and has a compact resin bonded fibrous stratum.

12. A playing surface structure according to claim 11 wherein a second vertically lapped textile mat lies beneath the second random pile textile mat.

13. A playing surfave structure comprising, in order:
a surface carpet layer having a sand laden pile;
a resin impregnated textile layer having rubber particles bonded thereto;
a first random pile textile mat which is laden with rubber particles, and which comprises a compact resin bonded a fibrous stratum;
a verically lapped textile mat; and
a second random pile textile mat which is laden with rubber particles, and has a compact resin bonded fibrous stratum.

* * * * *